(No Model.) 4 Sheets—Sheet 1.

W. FRASER.
FURNACE.

No. 465,367. Patented Dec. 15, 1891.

Witnesses.
J. A. Rutherford.
J. H. Daly.

Inventor.
William Fraser.
By James L. Norris.
Attorney.

(No Model.) 4 Sheets—Sheet 2.
W. FRASER.
FURNACE.
No. 465,367. Patented Dec. 15, 1891.
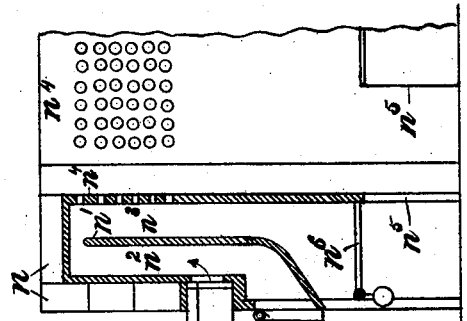
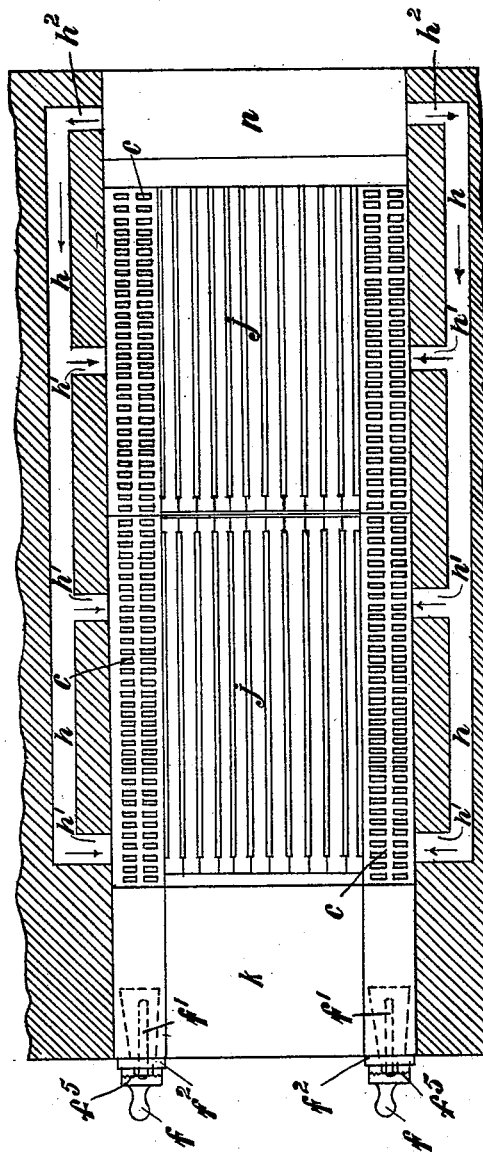
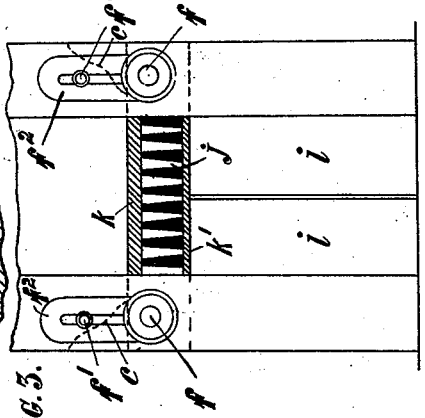
Witnesses.
J. A. Rutherford.
J. H. Daly.
Inventor.
William Fraser
By James L. Norris.
Attorney (No Model.) 4 Sheets—Sheet 3.
W. FRASER.
FURNACE.
No. 465,367. Patented Dec. 15, 1891.
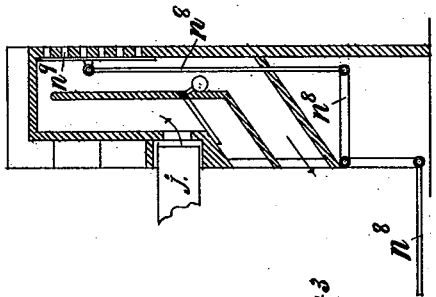
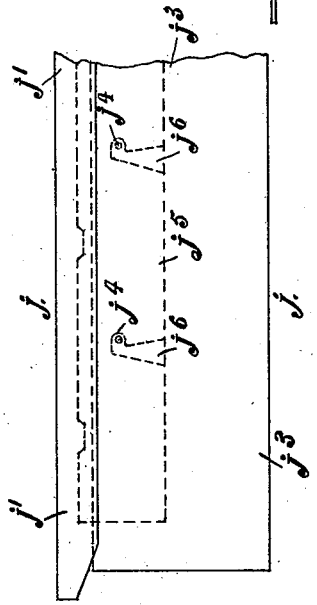
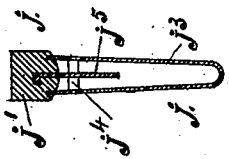
Witnesses.
J. A. Rutherford
J. H. Daly
Inventor.
William Fraser
By James L. Norris
Attorney (No Model.) 4 Sheets—Sheet 4.
W. FRASER.
FURNACE.
No. 465,367. Patented Dec. 15, 1891.
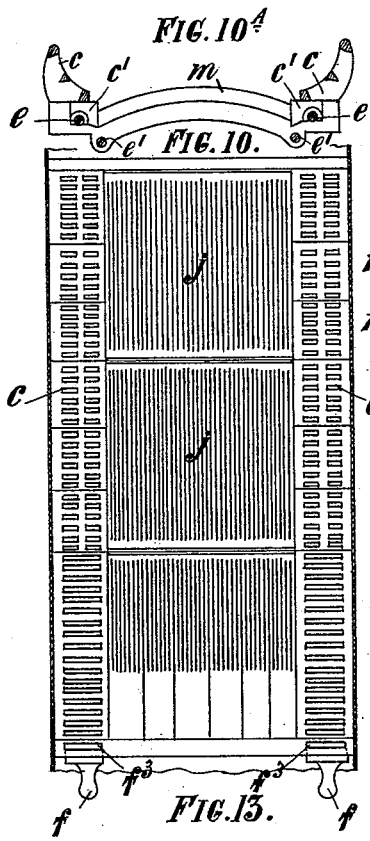
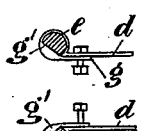
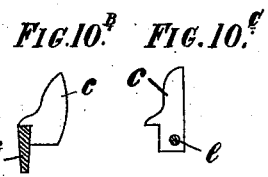
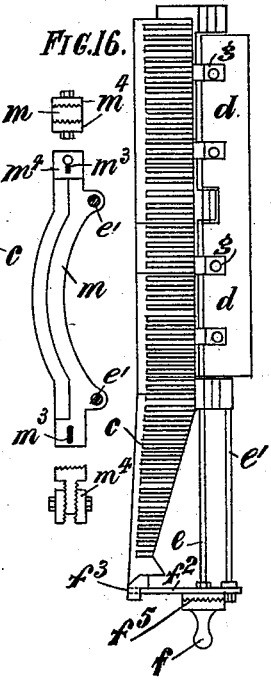
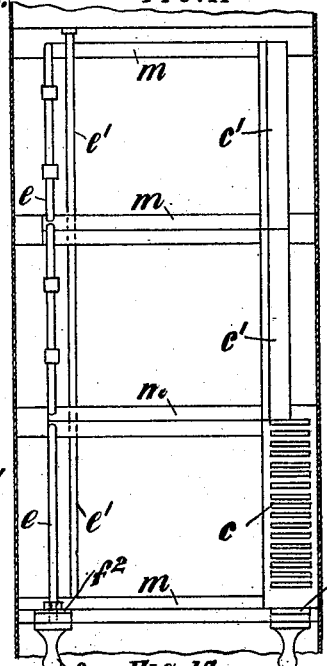
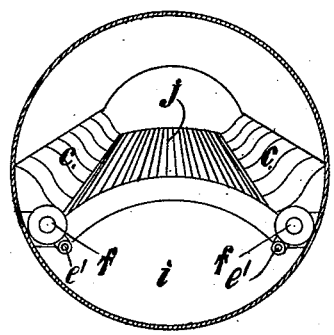
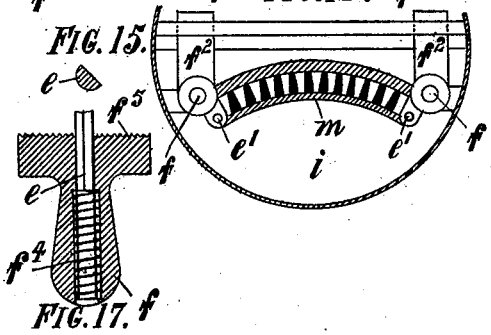
Witnesses
J. A. Rutherford
J. H. Daly
Inventor.
William Fraser
By James L. Norris.
Attorney.

UNITED STATES PATENT OFFICE.

WILLIAM FRASER, OF SPARKBROOK, ASSIGNOR OF ONE-HALF TO JOHN GOLDIE CHAPMAN, OF BIRKENHEAD, ENGLAND.

FURNACE.

SPECIFICATION forming part of Letters Patent No. 465,367, dated December 15, 1891.

Application filed May 7, 1891. Serial No. 391,927. (No model.)

*To all whom it may concern:*

Be it known that I, WILLIAM FRASER, a subject of the Queen of Great Britain and Ireland, residing at Sparkbrook, near Birmingham, in the county of Warwick, England, have invented certain new and useful Improvements in Furnaces; and I do hereby declare that the following is a full, clear, and exact description of the invention, which will enable others skilled in the art to which it appertains to make and use the same.

The object of this invention is, mainly, to supply boiler-furnace, muffles, and the like with the necessary oxygen to insure perfect combustion at as high a temperature as possible and to provide hollow furnaces therefor.

To accomplish this object my invention involves the features of construction and the combination or arrangement of devices hereinafter described and claimed, reference being made to the accompanying drawings, in which—

Figure 1 is a vertical sectional view of a boiler-furnace embodying my invention. Fig. 2 is a horizontal sectional view of the same. Fig. 3 is a front elevation, partly in section, to show the front of the furnace. Fig. 4 is a detail sectional view showing an intermediate hollow bearer for supporting the furnace-bars. Fig. 5 is a detail plan view showing one of the end bearers. Fig. 6 is a detail sectional view showing a section of the hollow fire-bars connected with the hollow bridge. Fig. 7 is a detail sectional view showing a modified construction of the bridge. Figs. 8 and 9 are detail views of one of the hollow fire-bars. Fig. 10 is a plan view of a modified construction adapted for a Lancashire or Cornish boiler. Fig. $10^a$ is a cross-sectional view of the same. Figs. $10^b$, $10^c$, and $10^d$ are detail views hereinafter explained. Fig. 11 is a plan view of the frame-work of a grate constructed according to my invention. Fig. 12 is a vertical sectional view, partly in elevation, of the construction exhibited by Fig. 10. Fig. 13 is a transverse sectional view of a furnace-grate fitted in a tube. Fig. 14 is a detail cross-sectional view of the construction exhibited by Figs. 10 and 11. Figs. 15, 16, and 17 are detail views hereinafter explained.

$a$ is the boiler.
$b$ is the grate.
$c$ are the air-diffusers.
$d$ are the air-regulators.
$e$ are the regulating-rods.
$f$ are the handles on said rods, and the dotted space within the lines (marked $h$) represents a large air-channel in the brick-work on the far side of the furnace.

$h'$ are small channels for conveying the heated air to the ash-pit, and $h^2$ a connecting-channel between the bridge and the two main channels.

$i$ is the ash-pit.
$f'$ is a bolt for fastening the plate $f^2$ to the brick-work. (See Figs. 1, 2, and 3.)
$j$ are the furnace-grate or middle fire-bars.
$k$ is the hollow dead-plate.

In Fig. 3, $k$ is the upper part, and $k'$ the lower part, of the hollow dead-plate, and $j$ the ends of the hollow bars. $i$ is the ash-pit and $f$ the air-regulator handles, and $f^2$ are the fastening-plates.

Fig. 4 shows an intermediate hollow bearer, in vertical section, for supporting the furnace-bars. The end distance-pieces in this figure are marked $m'$, and can be varied in thickness for the purpose of lengthening or shortening the said bearer.

Fig. 5 represents the end bearers, looking down upon them, and also the middle bearer scalloped on both sides for the purpose of supporting the fire-bars from both sides, in the manner shown in Fig. 6, and marked $m$.

Figure 1:
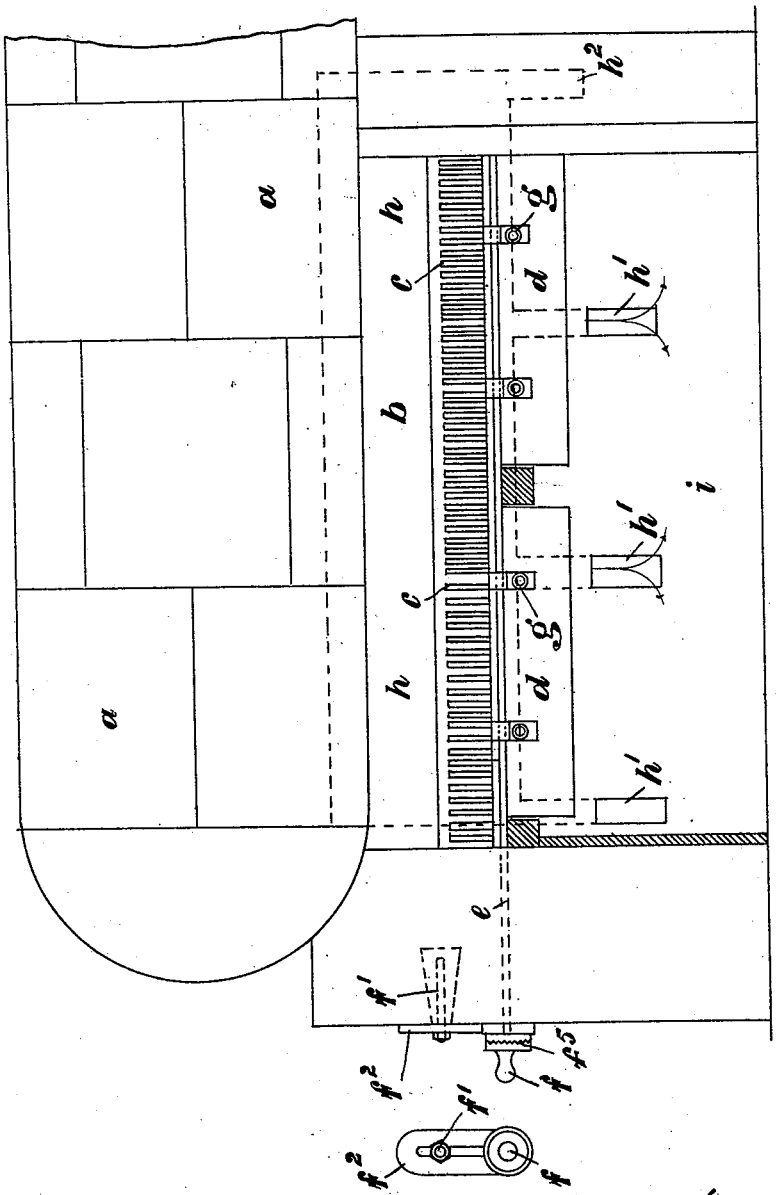

In Fig. 6, $j$ are the furnace-bars. $n$ is the bridge, and $n'$ is a division-plate dividing it into two compartments $n^2$ and $n^3$. $n^4$ is the back plate, the top part of which is perforated for allowing part of the heated air to be distributed behind the bridge, $n^5$ being a door at the bottom for the purpose of removing soot and the like. $n^6$ and $n^7$ are damper-doors.

Fig. 7 is a modification of the bridge, fitted with operating and regulating rods (marked $n^8$) and damper $n^9$.

The fire-bar, Figs. 8 and 9, consists of a removable or cast part $j'$ and lower hollow part $j^3$, made of sheet steel or iron. $j^4$ are rivets or pins that keep the hollow part together and by which the top and bottom parts are fastened or secured together. $j^5$ is the "back-bone" of the top or cast part of the bar, and is by preference made of sheet-steel or malleable iron and having slots marked $j^6$ therein. At the top it is turned over and cut to the proper length before being laid in the mold for the metal to be cast or run round it. By so doing all machine-work is avoided and the bottom part of the top of the bar is also much lighter and stronger than if in cast-iron. It will also be observed that the top edges of the sheet metal lie in grooves in the under side of the cast top of the bar. Thus both metals expand and contract together, and dust is prevented from falling into the hollow part of the bar.

With reference to the arrangement shown in Fig. 2 the air required for combustion is all drawn through the fire-bars $j$, and is discharged into the hollow bridge $n$, whereby it is thoroughly heated. From here the two channels $h^2$ convey the air into the main channels $h$, and the small outlets $h'$ discharge the heated air into the ash-pit below the level of the furnace-grate. The supply of air from the ash-pit to the air-diffusers $c$ is regulated by the doors $d$—that is, these doors regulate the amount of air to be admitted at the sides of the furnace for the requirements of the fuel on the upper or top sides thereof.

In Figs. 1, $10^d$, and 12, the regulators $d$ are shown. The regulating-handle $f$ thereof and the locking-plate $f^2$, connected therewith, are both notched in the face so as to lock with each other, and the former is fitted with a spiral spring $f^4$ and collar to cause the two notched faces to gear with each other. Thus by these devices the regulators $d$ can be opened or closed to any extent required, and the instant the handle is released it catches on the plate $f^2$ and remains in a locked position.

Figs. 6 and 7 show two constructions of the hollow bridge according to this invention, the air being conveyed by the hollow bars into the chamber marked $n^2$. It ascends one side of the plate $n'$ and descends the other side. The back chamber $n^3$ conveys the air either into the side channels $h$, as in Figs. 1 and 2, or directly into the ash-pit $i$, or through the back perforated plate shown in Fig. 6 and marked $n^4$, or the same can be distributed by all the different sources mentioned, or by any one in particular, if so desired. By said arrangement the temperature of the air is increased to such an extent by traveling through the bars, the bridge, and side channels in the brick-work that complete combustion is thereby obtained, and the life of the furnace-bars, furnace-linings, bridge, and fittings is also very considerably prolonged by the cooling effect of the air.

Fig. 10 is a plan of a grate constructed according to our invention for Lancashire or Cornish boilers.

Referring to Figs. 10 to 14, $c'$ are the bearers for supporting the air-diffusers $c$. $e'$ are the stay-rods for keeping the grate together, and $e$ the regulator-rods for working the air-regulators $d$. (See Figs. $10^d$ and 12.) The plates marked $f^2$ are adjustable and can be raised or lowered to any extent by passing the tails of the same through slots marked $f^3$ in Figs. 10, 11, and 12. The circular bearer marked $m$, Fig. 14, shows the openings for the air to pass through.

Fig. 17 shows the handle $f$ of the regulating-valves $d$ in section, a coil-spring $f^4$ keeping said handle in gear with the plate $f^2$, the teeth on same being designated $f^5$.

Fig. 16 shows a circular bearer for carrying the bars. In this construction the extremities of the bearer-bar $m$ are each provided with teeth or serrations at their opposite sides, with which engage similarly toothed or serrated plates $m^4$, having longitudinal slots $m^3$, through which pass a clamping-bolt in such manner that by loosening the clamping-bolt the plates $m^4$ can be adjusted outwardly or inwardly to increase or diminish the length of the bearer-bar to suit the conditions required.

In fitting a Lancashire or Cornish boiler according to my invention the circular or straight bearers, if so desired, are supported by the walls of the tube in the ordinary way, and the construction of bar shown in Fig. 16 for shortening or lengthening the bearer is of great service in being able to effect a proper bearing in the tubes, where lap-joints occur in particular. The ash-pit, (marked $i$ in Figs. 13 and 14,) if my compound bar is used, would be fitted with close-fitting doors, and all the air required for the grate would be drawn by the bars through the dead-plate and discharged into the bridge, as shown in Fig. 7. The air is then discharged from here direct into the ash-pit and part of it behind the bridge, as already described.

The air-diffusers $c$, as shown in section in Fig. $10^a$, can be made to rest upon the bearer-bar (marked $c'$) or to rest upon ordinary fire-bars, as shown in Fig. $10^b$. If used for a tube, they would be made to fit the diameter of said tube, as shown; but if for a brick-built grate they would be made as shown in Fig. $10^c$, and with lugs cast on their under side for supporting the regulator-rods. If, however, the diffusers be supported upon the grate-bars, the bearers $c'$ would be dispensed with. The said diffusers can be made in sections of any length or height required and the air-orifices made any size or dimensions.

The object in having the grate in circular form and as low as possible is for the purpose of increasing the heating-surface in the furnace or top part of the grate, the best results being got by keeping the top of the air-diffusers below the center line of the furnace, as shown in Fig. 13. The said grate proper can be filled with solid treble bars, as shown in Fig. 10, instead of with my compound bar, when air is supplied in the ordinary way to the ash-pit; but I would prefer the former.

The dead-plates in the Cornish or Lancashire class of boilers are straight at the door and gradually take the curve of the grate about eighteen inches or thereabout along the grate.

Fig. $10^d$ shows the brackets $g$ for connecting the regulators $d$ to the rods $e$. These rods and brackets have a flat side upon them, (marked $g'$ in Fig. $10^d$.)

What I claim in respect of the herein-described invention is—

1. The combination, in a furnace, of a hollow dead-plate, hollow bars, and a hollow bridge through which air is introduced, ash-pit doors by which entrance of air into the ash-pit is prevented, and plates having apertures therein disposed at the sides of the furnaces and communicating with the ash-pit, whereby air from the ash-pit is delivered above the fuel on the grate, substantially as described.

2. In a furnace, the combination of hollow bars $j$, a hollow bridge $n$, into which air to support the combustion of fuel is introduced, air-diffusers $c$, disposed at each side of the furnace and adapted to deliver air above the fuel on the grate, and valves $d$, by which communication between the air-diffusers and the ash-pit is controlled, substantially as described.

3. In a furnace, the combination of hollow fire-bearers or bars $j$, consisting of an upper cast part $j'$ and a lower portion $j^3$, sheet-metal bent to a hollow channel form, and a hollow bridge into which said bars are adapted to deliver air, substantially as described.

4. A furnace having its sides composed of brick-work, and air-channels $h\ h'$ therein, in combination with hollow fire-bars $j$ and a hollow bridge $n$, air being conveyed through the said fire-bars and bridge and air-channels into the ash-pit of the furnace, substantially as set forth.

5. In combination with the hollow fire-bars $j$, the hollow bridge $n$, comprising two chambers $n^2$ and $n^3$ and a stationary vertical partition $n'$, by which said bridge is formed into two separated compartments, and air-passages $n^4$, formed in the back of the said bridge, substantially as described.

6. The combination, in a furnace, of hollow fire-bars, said bars consisting of an upper cast part $j'$ and a sheet-metal bent lower portion $j^3$, connected to the upper portion by a web-plate $j^5$, substantially as set forth.

7. In a furnace, the combination of hollow fire-bars $j$, through which air is introduced into the bridge-wall, channels for conducting the air into the ash-pit, side air-diffusers $c$, valves $d$, by which air from the ash-pit to said diffusers is controlled, and spring-retained handles $f$, having a shoulder with serrations or roughened surface $f^5$, by which said valves $d$ are operated and kept in position, substantially as described.

In testimony whereof I hereunto affix my signature in presence of two witnesses.

WILLIAM FRASER.

Witnesses:
ERNEST R. ROYSTON,
JAMES ANDREW CONBROUGH,
    *Both of 15 Water Street, Liverpool.*